Figure 1:
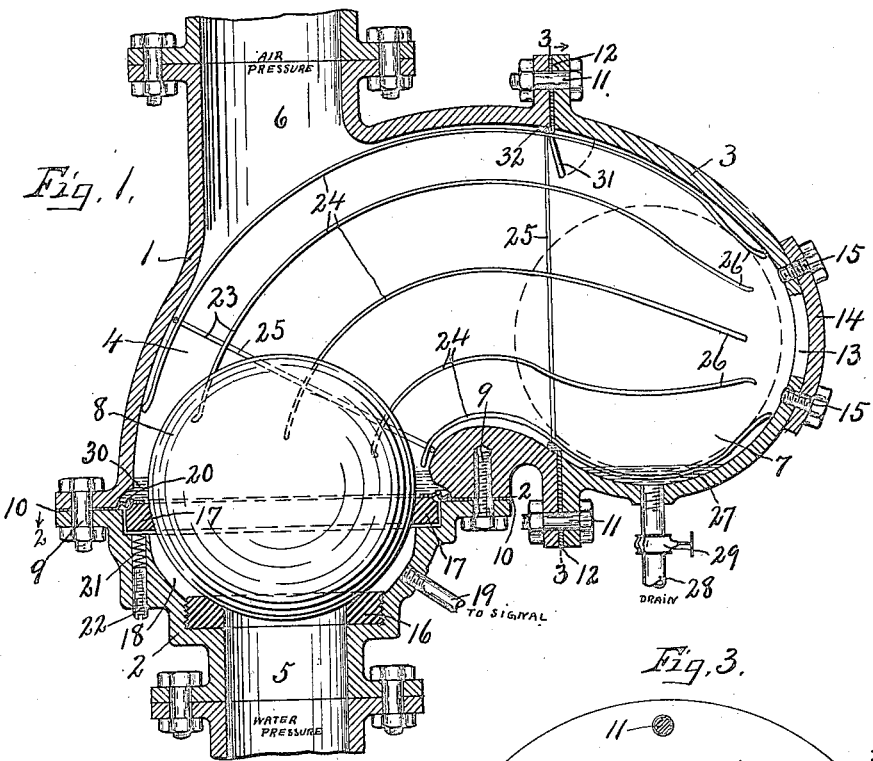

W. O. REALS.
VALVE CONTROL FOR AUTOMATIC SPRINKLER SYSTEMS.
APPLICATION FILED FEB. 17, 1921.

1,432,257. Patented Oct. 17, 1922.

Patented Oct. 17, 1922.

1,432,257

UNITED STATES PATENT OFFICE.

WILLIS O. REALS, OF UTICA, NEW YORK.

VALVE CONTROL FOR AUTOMATIC SPRINKLER SYSTEMS.

Application filed February 17, 1921. Serial No. 445,677.

*To all whom it may concern:*

Be it known that WILLIS O. REALS, of Utica, in the county of Oneida, in the State of New York, has invented new and useful Improvements in Valve Controls for Automatic Sprinkler Systems, of which the following, taken in connection with the accompanying drawings, is a full, clear, and exact description.

This invention relates to certain improvements in dry pipe sprinkler systems and refers more particularly to the main valve for controlling the flow of the fire extinguishing liquid to said system.

In an apparatus of this character, the water inlet is normally closed by a valve under air pressure in the distributing system and remains in this closed position for an indefinite period of time depending entirely upon the reduction of the air pressure in the system by leakage or by the releasing of one or more of the sprinkler head valves due to heat in the immediate vicinity thereof in case of fire.

Under these conditions, particularly after a long period of the closing of the valve, there is always more or less liability of the valve adhering to its seat by corrosion, accumulation of scale and other causes which may render the valve inoperative or unresponsive and the main object of the invention is to reduce to a minimum this possible contingency and at the same time to afford a clear passage for the fire extinguishing fluid to said system when the valve is opened by the reduction of air pressure from any cause in any part of the distributing system.

Another object is to employ a plurality of coaxial valve seats in axially spaced relation co-operating with a ball valve to form an intervening vent chamber to which a suitable signal or alarm may be connected for the purpose of indicating any abnormal conditions in the relative air and water pressures on opposite sides of the valve.

A further object is to provide the valve case with a lateral branch passage extending a sufficient distance to one side of the water and air ports to permit the passage of the ball valve therein and establish an obstructed passage for the fire extinguishing fluid from the water inlet port to the distributing system.

A still further object is to provide means for guiding the valve from its normally closed position into said chamber and to utilize a portion of said guiding means as a buffer to avoid injurious contact of the ball valve with the walls of the valve case.

Other objects and uses relating to the specific parts of the valve mechanism will be brought out in the following description.

In the drawings:

Fig. 1 is a longitudinal, vertical, sectional view of my invention.

Figure 2:
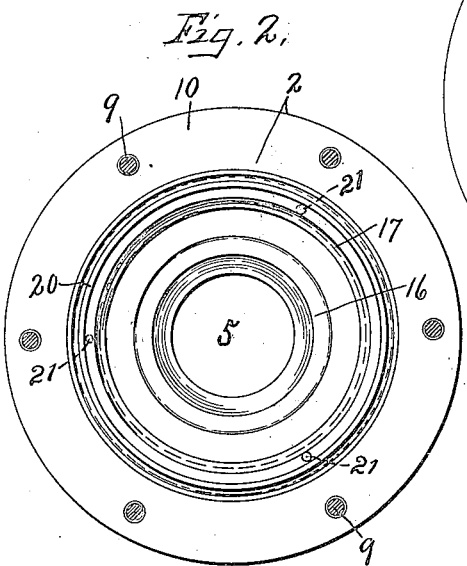
Figure 3:
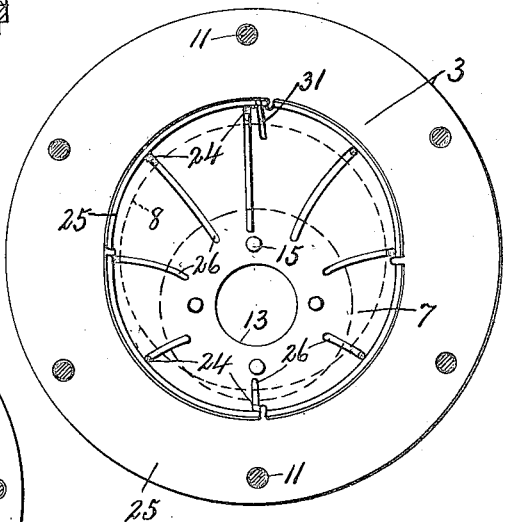

Figs. 2 and 3 are sectional views taken in the planes of lines 2—2 and 3—3, Fig. 1.

As illustrated, the valve case is made up of a series of, in this instance, three hollow sections, 1, 2 and 3 forming a valve chamber —4—, having coaxial ports —5— and —6— near one side thereof, the port —5— serving as an inlet for water or other fire extinguishing fluid under pressure from any suitable source of supply, while the port —6— is connected to the dry pipe distributing system containing the usual sprinkler heads and in which air is normally maintained under pressure sufficient to normally close the valve, which controls communication between said ports.

The valve case —1— is provided with a lateral extension of which the section —3— forms a part, said extension being wholly to one side of, and between the ports —5— and —6— and forms a branch chamber —7— of sufficient size to receive a ball valve —8— therein when opened without obstructing in the least the free passage of the water from the port —5— to the port —6—, the lateral length of the chamber being considerably greater than the diameter of the valve.

The adjacent ends of the case sections —1— and —2— meet in approximately the horizontal plane of the center of the valve —8— when the latter is closed and are secured together by bolts —9— with an interposed packing or gasket —10— to prevent leakage.

The adjacent ends of the sections —1— and —3— meet in a substantially vertical plane some distance to one side of the ports —5— and —6— and are secured together by bolts —11— with interposed packings or gaskets —12— for reducing the liability of leakage, the outer end of the section —3— being provided with a hand hole —13— normally closed by a plate —14— which is held in operative position by bolts —15—.

The use of a ball or spherical valve —8— is preferable by reason of the fact that all portions of its surface is available for contact with one or more seats and that it is free to seat itself against all points of the valve seat or seats to form a tight joint therewith, said ball and its seats being preferably made of aluminum alloy or other non-corrodible material to reduce to a minimum the liability of adhering one to the other. A pair of rings —16— and —17— are mounted in vertically spaced relation within the lower case section —2— coaxial with the axis of the ports —5— and —6— to form separate seats for the ball valve —8—, which when closed cooperates with the rings —16— and —17— to form an intervening vent chamber —18— having a pipe —19— leading therefrom for connection with any suitable alarm or signal adapted to be operated by water pressure or air pressure to indicate any leakage of water or air between the valve and either of the seats —16— and —17—, the upper valve seat coacting with the ball to close communication between the vent chamber —18— and air pressure port —6—, while the valve seat —16— cooperates with the ball valve to cut off communication between the vent chamber —18— and water pressure port —5—.

The lower valve seat or ring —16— is preferably threaded and screwed into a socket in the section —2— for vertical adjustment if necessary but the upper valve seat or ring —17— is more or less floating in that it is yieldingly mounted upon a corrogated diaphragm or ring —20—, which may be of spring copper and, in this instance form a part of the packing or gasket —10—.

The upper ring or valve seat —17— is of slightly less internal diameter than the external diameter of the ball valve —8— so as to engage the periphery of the ball just below the horizontal diameter thereof with a relatively sharp wedging fit whereas the lower ring or seat —16— is of considerably less internal diameter than that of the upper ring —17— to engage the periphery of a relatively small segment of the ball at the under side thereof with a less degree of wedging action, it being understood that the diameters of the seat engaged by the ball corresponding to the diameter of the segment of said ball at the plane of engagement of the seats therewith, and that the fact that the upper seat is free to yield, enables the ball to positively engage both seats under the excess pressure of the air, acting upon a surface area of the ball considerably greater than that acted upon by the water pressure at the port —5—.

As a further means for yieldingly supporting the upper valve seat or ring —17—, I provide a series of light coil springs —21— mounted in suitable sockets in the lower case section —2— to exert upward pressure upon the ring —17— at equally spaced points throughout the circumference of the ring, the tension of said spring being adjusted by screws —22— which are also mounted in the case section —2— to engage the lower end of the springs.

It is, of course, evident that if the air pressure in the port —6— and chambers —4— and —7— should be suddenly relieved, as for example, by the opening of one of the sprinkler head valves due to fire in the immediate vicinity thereof, then water pressure in the port —5— would instantly unseat the valve —8— and force it into the lateral branch chamber —7— with considerable force, and in the absence of any protective means, might batter or otherwise impair the spherical surface of the ball by contact of the walls of the casing, and in order to obviate this possibility, I have provided a guide cage —23— extending from the normally closed valve —8— to the extreme outer end of the chamber —7— and of sufficient interior diameter to permit the free passage of the ball therethrough without contact with the walls of the case —1—, said cage consisting, in this instance, of lengthwise wires —24— following closely the walls of the chambers —4— and —7— across the inner end of the air pressure port —6—, and held in fixed spaced relation by circumferential tie-wires —25— to which the adjacent portions of the lengthwise wires —24— are secured by spot welding or other fastening means, said lengthwise wires being located within the circumferential tie-wires —25— to afford unobstructed runways for the valve in transit from its closed position to its extreme open position at the end of the branch chamber —7—.

One of the circumferential tie-wires —25— is disposed in a vertical plane nearly coincident with that of the meeting faces of the case sections —1— and —2— and is secured by spot welding or other equivalent fastening means to the gasket —12— which may be made of copper or other suitable metal and serves as a means for holding the cage in fixed relation to the valve case except as the wires may yield slightly under pressure of the ball in passing from its closed to its open position.

The ends of the lengthwise wires —24— beyond the upright tie-wire —25— converge toward the extreme outer end of the branch chamber —7— around a circle of considerably less diameter than that of the ball to form a series of spring buffers —26— which serve to check the momentum of the ball when thrown into its extreme open position and thereby additionally preserving the ball against impairment by contact with the adjacent end of the valve case.

The lower side or wall of the branch chamber —7— and adjacent portion of the cage —23— extends upwardly from the meeting faces of the case sections —1— and —2— and then returns downwardly and upwardly to form a dash-pot —27— containing a small quantity of water trapped therein to additionally protect the ball against impairment by preventing its contact with the lower side of the valve case.

A suitable drain pipe —28— leads from the dash-pot —27— and is provided with a valve —29— which is normally closed but may be opened at will to draw off the water from the branch chamber —7— whenever desired.

The joint between the valve —8— and upper valve seat —17— may be normally covered by a liquid seal —30— to additionally reduce the liability of leakage of air passing said joint.

In operation assuming that the valve —8— is closed against both of the seats —16— and —17— by the excess air pressure acting upon the upper side of the valve against the lower water pressure at the bottom of the valve, then if any one of the sprinkler head valves in the dry pipe system should be opened by heat due to fire in an immediate vicinity thereof, the air pressure would be immediately relieved, thereby allowing the water pressure to throw the valve from its closed position to its extreme open position in the outer end of the chamber —11— with the assurance that it would reach that position by reason of the guide wires of the cage —23—, and at the same time a portion of the water or air or both would be forced under pressure through the pipe —19— of the signal or alarm to indicate the presence of fire or some other abnormal condition which would relieve the air pressure in the pipe system.

It is also evident that if the joint between the valve —8— and either of the seats —16— or —17— should leak, it would allow either the water or air to enter the chamber —18— and pipe —19— and would thereby operate the signal or alarm to warn the attendant that repairs were necessary. In order to remove the ball or cage for repairs or other purposes, it is simply necessary to remove the bolts —11— and case section —3— which would permit the cage —23— to be withdrawn through the adjacent open end of the section —1— after which the ball could also be readily removed through the same opening.

Or if desired, the lower case section —2— may be removed by the removal of the bolts —9—, thus permitting the valve seats and ball to be withdrawn therewith after which the ball —8— and its valve seats —16— and —17— could be readily removed for repairs such as regrinding.

If necessary, a suitable detent —31— may be pivoted to the upper side of the cage —23— or to any other suitable support to normally project into the path of movement of the valve —8—, said detent being free to swing in the direction of open movement of the valve to allow the latter to pass beyond the detent to its extreme open position at the outer end of the chamber —7— but is provided with a shoulder —32— for engagement with the adjacent wall of the valve case to hold it against movement in the opposite direction from its normal position and thereby to restrain the open valve from returning to its seat from any cause until the detent is tripped.

What I claim is:

1. A main controlling valve for dry pipe sprinkler system comprising a valve case having opposite coaxial ports and a valve chamber extending wholly to one side of and between said ports, valve seats in spaced relation adjacent one of the ports to form an intervening vent chamber, and a valve seated on both valve seats and normally closing communication between both ports and the vent chamber.

2. A main controlling valve for dry pipe sprinkler system comprising a valve case having opposite coaxial ports and a valve chamber extending wholly to one side of and between said ports, valve seats in spaced relation adjacent one of the ports to form an intervening vent chamber, and a valve seated on both valve seats, and normally closing communication between both ports and the vent chamber, one of said valve seats being movable relatively to the other valve seat to enable the valve to seat snugly on both seats.

3. A main controlling valve for dry pipe sprinkler system comprising a valve case having opposite coaxial ports and a valve chamber extending wholly to one side of and between said ports, valve seats in spaced relation adjacent one of the ports to form an intervening vent chamber, and a valve seated on both valve seats, and normally closing communication between both ports and the vent chamber, and a cage for guiding the valve in its movement from the seats into the laterally extending chamber.

4. A main controlling valve for dry pipe sprinkler systems comprising a valve case having opposite coaxial ports and a valve chamber extending wholly to one side of and between said ports, valve seats in spaced relation adjacent one of the ports to form an intervening vent chamber, a valve seated on both valve seats and normally closing communication between both ports and the vent chamber and a relief pipe extending from the vent chamber for connection to a signal to indicate the unseating of the valve from either seat.

5 A valve mechanism for dry pipe sprinkler system comprising a valve case having opposite coaxial ports and a valve chamber extending laterally from said ports a distance greater than the diameter of the valve, valve seats within the case coaxial with one of said ports and spaced apart to form an intervening vent chamber, a passage leading from said vent chamber for connection to a suitable alarm, a valve engaging both of said seats and movable into the lateral extension of the valve chamber, and a guide cage for said valve extending into said chamber and having its outer end contracted to form a buffer for the valve to prevent contact of said valve with the valve case.

In witness whereof I have hereunto set my hand this 5th day of February, 1921.

WILLIS O. REALS.

Witnesses:
  H. E. CHASE,
  M. R. COOKE.